US011106111B2

(12) United States Patent
Liao et al.

(10) Patent No.: US 11,106,111 B2
(45) Date of Patent: Aug. 31, 2021

(54) MULTIPLE KERR-FREQUENCY-COMB GENERATION USING DIFFERENT LINES FROM A REMOTE KERR COMB

(71) Applicant: University of Southern California, Los Angeles, CA (US)

(72) Inventors: Peicheng Liao, Los Angeles, CA (US); Alan Willner, Los Angeles, CA (US); Ahmed Almaiman, Los Angeles, CA (US); Changjing Bao, Los Angeles, CA (US)

(73) Assignee: UNIVERSITY OF SOUTHERN CALIFORNIA, Los Angeles, CA (US)

( * ) Notice: Subject to any disclaimer, the term of this patent is extended or adjusted under 35 U.S.C. 154(b) by 0 days.

(21) Appl. No.: 16/979,153

(22) PCT Filed: Mar. 7, 2019

(86) PCT No.: PCT/US2019/021197
§ 371 (c)(1),
(2) Date: Sep. 8, 2020

(87) PCT Pub. No.: WO2019/173621
PCT Pub. Date: Sep. 12, 2019

(65) Prior Publication Data
US 2020/0401013 A1   Dec. 24, 2020

Related U.S. Application Data

(60) Provisional application No. 62/641,064, filed on Mar. 9, 2018.

(51) Int. Cl.
*G02F 1/365*  (2006.01)
*G02F 1/35*   (2006.01)

(52) U.S. Cl.
CPC ............ *G02F 1/365* (2013.01); *G02F 1/3511* (2013.01); *G02F 2203/56* (2013.01)

(58) Field of Classification Search
CPC ..... G02F 1/3511; G02F 1/365; G02F 2203/56
See application file for complete search history.

(56) References Cited

U.S. PATENT DOCUMENTS

| 7,982,944 B2 * | 7/2011 | Kippenberg | ............... G02F 1/39 359/330 |
| 10,270,529 B2 * | 4/2019 | Karpov | .................. G02F 1/3513 |

(Continued)

OTHER PUBLICATIONS

International Search Report dated Jun. 21, 2019 in corresponding International Application No. PCT/US2019/021197 filed Mar. 7, 2019; total pp. 3.

(Continued)

*Primary Examiner* — Daniel Petkovsek
(74) *Attorney, Agent, or Firm* — Snell & Wilmer LLP

(57) ABSTRACT

Methods, systems, and apparatus for generating Kerr frequency combs. The system includes a continuous-wave pump laser to provide a master comb pump. The system includes a microresonator that generates a master Kerr frequency comb using the master comb pump. The system includes a splitter that splits the master Kerr frequency comb into multiple CW comb lines including a first comb line used to transmit a data signal and a second comb line used as a slave comb pump. The system includes a combiner that is configured to combine the first comb line and the second comb line to produce a combination of a data channel and CW comb line. The system includes a second demultiplexer that extracts the second comb line that is used as the slave comb pump. The system includes another microresonator that uses the second comb line and generates a slave Kerr frequency comb.

20 Claims, 13 Drawing Sheets

(56) References Cited

U.S. PATENT DOCUMENTS

| | | |
|---|---|---|
| 2013/0308663 A1 | 11/2013 | Chen et al. |
| 2014/0064734 A1 | 3/2014 | Witzens |
| 2015/0159990 A1 | 6/2015 | Plusquellic et al. |
| 2018/0006730 A1* | 1/2018 | Kuo .................... H04B 10/616 |
| 2018/0048113 A1 | 2/2018 | Fermann et al. |
| 2019/0312402 A1* | 10/2019 | Lucas .................... H01S 3/005 |

OTHER PUBLICATIONS

Written Opinion of the International Searching Authority dated Jun. 21, 2019 in corresponding International Application No. PCT/US2019/021197 filed Mar. 7, 2019; total 4 pages.

Changjing Bao et al., "Tunable insertion of multiple lines into a Kerr frequency comb using electro-optical modulators", OSA Publishing, Optics Letters, vol. 42, Issue 19, pp. 3765-3768, Sep. 19, 2017.

* cited by examiner

MULTIPLE KERR-FREQUENCY-COMB GENERATION USING DIFFERENT LINES FROM A REMOTE KERR COMB

CROSS-REFERENCE TO RELATED APPLICATIONS

This application is a U.S. National Stage entry under 35 U.S.C. § 371 of International Application No. PCT/US2019/021197 filed Mar. 7, 2019, which claims priority to and the benefit of U.S. Provisional Patent Application No. 62/641,064 titled "MULTIPLE KERR-FREQUENCY-COMB GENERATION USING DIFFERENT LINES FROM A REMOTE KERR COMB," filed on Mar. 9, 2018, which applications are hereby incorporated by reference in their entirety.

STATEMENT AS TO FEDERALLY SPONSORED RESEARCH

This invention was made with government support under contract number FA9550-15-1-0166 awarded by the Air Force Office of Scientific Research and contract number N00014-16-1-2813 awarded by the Office of Naval Research. The government has certain rights in this invention.

BACKGROUND

Field

This specification relates to a system, method or apparatus for generating multiple Kerr frequency combs using different lines from a remote Kerr frequency comb for use in optical communications and/or in intra- or inter-data center communications.

Description of the Related Art

Kerr frequency combs ("Kerr combs") are one of many optical frequency combs consisting of a series of discrete and equidistant lines. These Kerr combs are generated by injecting a continuous wave pump laser into an optical resonator through the Kerr nonlinearity. The generated frequency comb lines from coherent conversion of the pump inside the resonator allow for efficient communication of optical signals. Typically, a single pump line from one Kerr comb can be used subsequently to generate another comb on the same chip. These Kerr combs have several potential uses in optical systems. Examples in optical communications include: (i) using each comb line as a laser source in a wavelength-division-multiplexed (WDM) system, and (ii) using each different comb line as a unique local oscillator (LO) in a coherent detection system. Other potential uses include using a combination of the above, such that a selection of multiple lines from a "master" transmitter (Tx) comb could each be used to generate a "slave" Kerr comb at multiple receivers (Rx) sites to be used potentially as LOs in high-capacity intra- or inter-data center communications. A single Kerr comb transmitted on a single line, however, can only be received by a single receiver for a singular purpose at a single destination. Generally, multiple light sources are needed to transmit optical signals to multiple receivers in different locations or places. This requires more hardware and more complexity to transmit optical data signals to multiple receivers.

Accordingly, there is a need to reduce the complexity and resource requirements for the formation and transmission of multiple Kerr combs to allow for transmission of multiple signals to different receivers in different places or locations to facilitate intra- or inter-data communications.

SUMMARY

In general, one aspect of the subject matter described in this specification may be embodied in an optical communication system. The communication system includes a continuous-wave (CW) pump laser that is configured to provide a master comb pump. The communication system includes a master microresonator connected to the CW pump laser. The microresonator is configured to generate a master Kerr frequency comb using the master comb pump. The communication system includes a splitter or first demultiplexer connected to the master microresonator. The splitter is configured to receive the master Kerr frequency comb and split or demultiplex the master Kerr frequency comb into multiple CW comb lines. The multiple CW comb lines include a first comb line used to transmit a data signal and a second comb line used as a slave comb pump. The communication system includes a combiner or multiplexer connected to the splitter or the first demultiplexer. The combiner or multiplexer is configured to combine the first comb line carrying signal and the second comb line to produce a combination of a data channel and CW comb line before fiber transmission. The communication system includes a second demultiplexer that is configured to receive the combination of data channel and CW comb line. The second demultiplexer is configured to extract the second comb line that is used as the slave comb pump. The communication system includes a slave microresonator connected to the second demultiplexer. The slave microresonator is configured to receive the second comb line and use the second comb line as the slave comb pump to generate a slave Kerr frequency comb.

These and other embodiments may optionally include one or more of the following features. The communication system may include a demodulator connected to the slave microresonator. The demodulator may be configured to receive the generated slave Kerr frequency comb. The demodulator may be configured to mix the generated slave Kerr frequency comb with the data signal on the first comb line to demodulate the data signal. The demodulator may be configured to output the demodulated data signal that has reduced phase noise or eliminated the phase noise altogether, which increases the overall performance within of the communication system. The slave Kerr frequency comb may be mutually coherent with the master Kerr frequency comb.

The multiple CW comb lines may include a third comb line used to transmit a second data signal and a fourth comb line used as a second slave comb pump. The communication system may include a second combiner that may be configured to combine the third comb line and the fourth comb line to form a second combination of a data channel and CW comb line. The communication system may include a third demultiplexer that may be configured to extract the fourth comb line that is used as the second slave comb pump. The communication system may include a second slave microresonator. The second slave microresonator may be configured to receive the fourth comb line and use the fourth comb line as the second slave comb pump to generate a second slave Kerr frequency comb. The combination of the data channel and CW comb line may be transmitted through a single-mode fiber (SMF) to the second demultiplexer.

In another aspect, the subject matter may be embodied in a communication system. The communication system includes a laser for providing a master comb pump. The communication system includes a first microresonator connected to the pump controlled by an arbitrary function generator to control the wavelength of the master comb pump to generate a master Kerr frequency comb. The communication system includes a first demultiplexer coupled to the first microresonator. The first demultiplexer is configured to split the master Kerr frequency comb onto multiple comb lines including a first comb line as a slave comb pump and a second comb line with a data signal. The communication system includes a combiner. The combiner is configured to combine the slave comb pump with the data signal. The combiner is configured to transmit the combined slave comb pump and the data signal. The communication system includes a second demultiplexer. The second demultiplexer is configured to receive the combined slave comb pump and data signal and select or extract the slave comb pump from the combined slave comb pump onto a first comb line. The communication system includes a second microresonator. The second microresonator is configured to generate a slave Kerr frequency comb from the slave comb pump. The communication system includes a photodetector connected to the second microresonator. The photodetector is configured to output a demodulated signal using the generated slave Kerr frequency comb and the data signal on a second comb line. The generated slave Kerr frequency comb is mutually coherent with the master Kerr frequency comb.

In another aspect, the subject matter may be embodied in a method of generating multiple Kerr frequency combs. The method includes providing, using a laser, a master comb pump. The method includes generating, using a first microresonator, a master Kerr frequency comb using the master comb pump. The method includes splitting or demultiplexing, using a splitter or demultiplexer, the master Kerr frequency comb into multiple comb lines. The multiple comb lines include a first comb line used to transmit a first data signal, a second comb line used as a first slave comb pump, a third comb line used to transmit a second data signal and a fourth comb line used as a second slave comb pump. The method includes combining, using a first combiner, the first data signal and the first slave comb pump into a first combined signal. The method includes combining, using a first combiner, the first data signal and the first slave comb pump into a first signal. The method includes combining, using a second combiner, the second data signal and the second slave comb pump into a second combined signal. The method includes transmitting, using the first combiner, the first combined signal to a first receiver and transmitting, using the second combiner, the second combined signal to a second receiver.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale and may be exaggerated to better illustrate the important features of the present invention.

DETAILED DESCRIPTION

Disclosed herein are systems, apparatuses, devices and/or methods for generating multiple Kerr frequency combs using different lines from a remote Kerr frequency comb for use in optical communications and/or in intra- or inter-data center communications. The optical communication system ("communication system") generates multiple Kerr frequency combs from a single master Kerr comb to distribute, send or otherwise transmit one or more data signals to one or more receivers.

Particular embodiments of the subject matter described in this specification may be implemented to realize one or more of the following advantages. The communication system generates a master Kerr frequency comb ("master Kerr comb") and forms one or more slave comb pumps that are each mixed or multiplexed with a corresponding modulated data signal. The slave comb pumps are formed on separate comb lines from the corresponding modulated data signals. Each slave comb pump and the corresponding modulated data signal are mixed or multiplexed into a combined signal. By forming multiple slave comb pumps from a single master Kerr comb and splitting the multiple slave comb pumps onto different comb lines and mixing or multiplexing different modulated data signals with the slave comb pumps, the communication system may send or otherwise transmit multiple combined signals to different receivers at different locations.

Other benefits and advantages include multiplexing or mixing the slave comb pump with the corresponding modulated data signal. This reduces the overall amount of phase noise or error introduced into the data when sent or otherwise transmitted to a remote receiver and later demodulated. Additionally, this reduces the overall hardware complexity of the receivers receiving the data signal.

Figure 1:
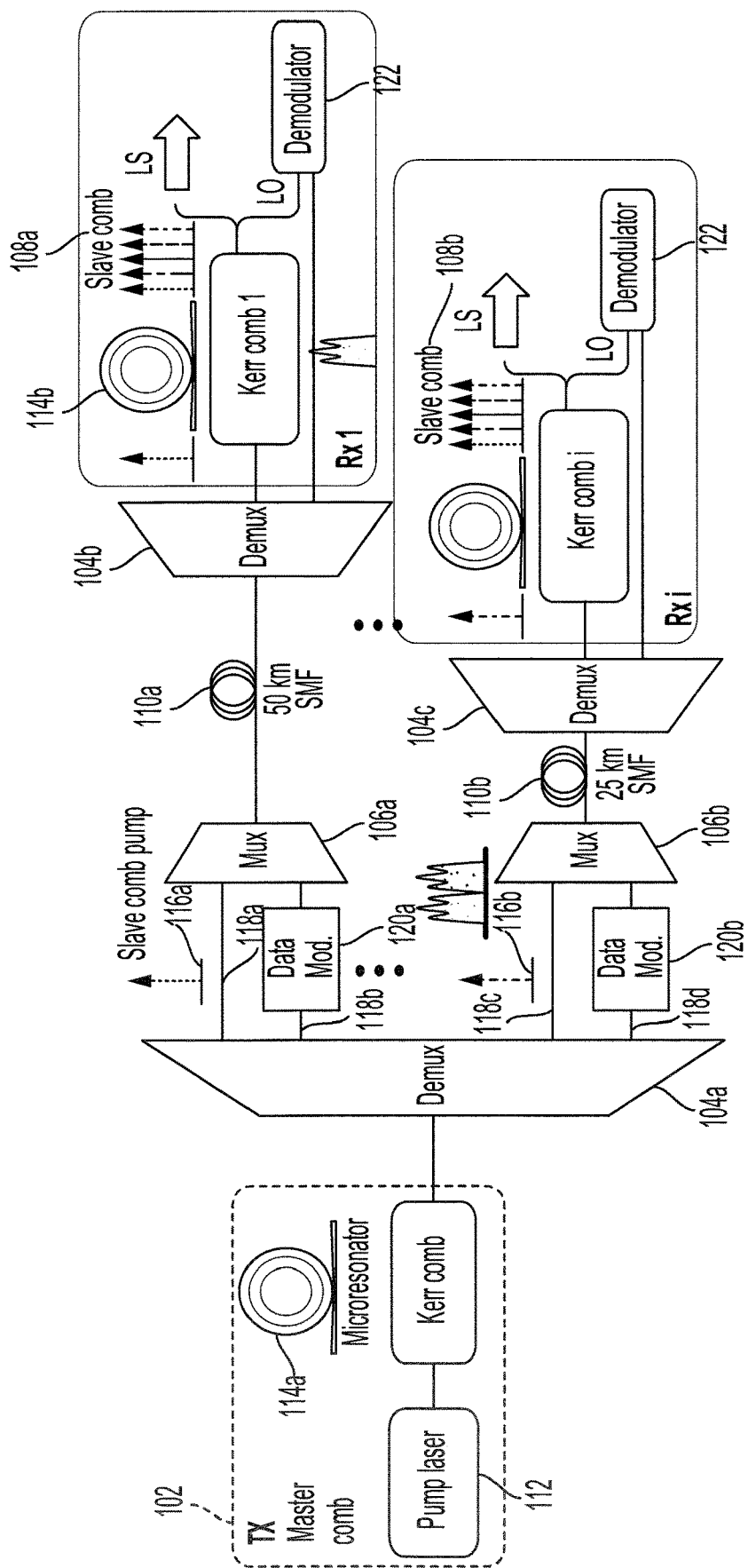
FIG. 1 shows an example optical communication system according to an aspect of the invention.

FIG. 1 shows an optical communication system ("communication system") 100. The communication system 100 forms a master Kerr comb and generates multiple slave Kerr combs from the master Kerr comb. Each of the multiple slave Kerr combs may be combined with a corresponding modulated data signal to be sent or transmitted to a different receiver. This allows the transmitter to generate and send data signals to multiple receivers in different remote locations or places.

The communication system 100 includes a transmitter 102, one or more demultiplexers 104a-c or other splitters, one or more multiplexers 106a-b or other combiners, and one or more receivers 108a-b. The communication system 100 may include one or more single mode fibers (SMF) 110a-b.

The transmitter 102 includes a light source 112 and a microresonator. The light source 112 may be a continuous wave (CW) laser diode, or other laser. The light source 112 is coupled to the microresonator 114a and generates a master comb pump or other laser. The light source 112 provides the master comb pump to the microresonator 114a, which forms the master Kerr frequency comb ("master Kerr comb") using the master comb pump.

The one or more microresonators 114a-b may include a master microresonator 114a and a slave microresonator 114b. The master microresonator 114a may be located or positioned within the transmitter 102 and the slave microresonator 114b may be located or positioned within the one or more receivers 108a-b. A microresonator traps a continuous laser light and forms optical frequency combs. The microresonator 114a generates the master Kerr frequency comb ("master Kerr comb") using the master comb pump by trapping the master comb pump and converting the master comb pump into multiple optical pulses. The microresonator 114a may use parametric frequency conversion to generate the master Kerr comb. The microresonator 114a outputs the master Kerr comb and provides the master Kerr comb to a demultiplexer 104a or other splitter.

The demultiplexer 104a splits and transmits the master Kerr comb to different slave sites through different lengths of single-mode fiber (SMF) 110a-b. The demultiplexer 104a splits the master Kerr comb into one or more comb lines. Each of the one or more comb lines may have a slave comb pump, e.g., formed from the CW pump laser, or a modulated data signal. The demultiplexer 104a places each of the one or more slave comb pumps 116a-b onto different comb lines 118a-d. For example, the demultiplexer 104a may split the master Kerr comb into a first slave comb pump 116a, a second slave comb pump 116b, or any number of slave comb pumps and place or output the first slave comb pump 116a onto a first comb line 118a, the second slave comb pump 116b onto a second comb line 118b, and the third slave comb pump onto a third comb line (not shown). The slave comb pump is an unmodulated signal. The demultiplexer 104a may also split one or more modulated data signals 120a-b and place the modulated data signals 120a-b onto a different comb line 118a-d, e.g., the modulated data signal 120a onto comb line 118b and the modulated data signal 120b onto comb line 118d.

The one or more comb lines 118a-d provide the different slave comb pumps 116a-b and the corresponding modulated data signals 120a-b on the different comb lines 118a-d to one or more multiplexers 106a-b or other combiners. The one or more multiplexers 106a-b may be an array waveguide grating or a tunable fiber Bragg grating. The one or more multiplexers 106a-b mix, multiplex or otherwise combine the slave comb pumps 116a-b with their corresponding modulated data signals 120a on the other comb line to form a combined signal of the slave comb pump and the corresponding modulated data signal before fiber transmission. The one or more multiplexers 106a-b send or otherwise transmit the combined signal across the one or more SMFs 110a-b of different lengths or distances to the one or more receivers 108a-b.

An SMF is an optical fiber designed to carry light only directly down the fiber. The one or more SMFs 110a-b may have different lengths, such as 50 km or 25 km. The one or more multiplexers 106a-b send the combined signal across the one or more SMFs 110a-b to one or more demultiplexers 104b-c or other splitters, which provide the components of the combined signals to the different receivers 108a-b. For example, a first multiplexer 106a sends a first combined signal across the SMF 110a to the demultiplexer 104b and a second multiplexer 106b sends a second combined signal across the SMF 110b to the demultiplexer 104c.

The one or more demultiplexers 104b-c or other splitters select, split or otherwise extracts the slave comb pumps 116a-b and the modulated data signals 120a-b from the combined signals onto different comb lines and feeds the different comb lines into one or more receivers 108a-b. Each slave comb pump 116a-b and each modulated data signal 120a-b is separated onto a separate different comb line. That is, a first slave comb pump 116a is on one comb line and the corresponding modulated data signal 120a is on another comb line. The comb line with the slave comb pump and the comb line with the modulated data signal feed into the one or more receivers 108a-b. For example, the demultiplexer 104b selects, splits or otherwise extracts the slave comb pump 116a and the modulated data signal 120a from the combined signal sent across the SMF 110a, and the demultiplexer 104c selects, splits or otherwise extracts the slave comb pump 116b and the modulated data signal 120b from the combined signal sent across the SMF 110b.

The one or more receivers 108a-b include a microresonator, such as a slave microresonator 114b and a demodulator 122. The slave microresonator 114b receives the comb line and uses the comb line as the slave comb pump to generate a slave Kerr frequency comb. The slave microresonator 114b may be coupled to and may feed or otherwise provide the slave Kerr frequency comb to the one or more demodulators 122. The slave Kerr frequency comb may be mutually coherent with the master Kerr frequency comb. The receiver 108a receives the comb lines from the demultiplexer 104b and the receiver 108b receives the comb lines from the demultiplexer 104c. Since there is a well-defined phase relationship between the slave comb pump and the comb lines of the master Kerr comb, the master and slave combs are mutually coherent enabling many potential applications. For example, in optical communications and networks, the combs can be exploited for coherent light sources as well as multi-wavelength local oscillators to demodulate the corresponding data channels, which can potentially reduce the complexity of the receiver in terms of the configuration and digital signal processing. Moreover, the master and slave combs may be utilized as two comb sources in some instances.

The one or more demodulators 122 extract the data signal from the modulated data signal that was previously combined with the slave comb pump on the comb lines. The one or more demodulators 122 mix the slave Kerr frequency comb on one comb line with the modulated data signal, which is on a separate comb line from the demultiplexer 104b-c. This allows the one or more demodulators 122 to demodulate the data signal with reduced noise, such as phase noise. The one or more demodulators 122a-b output the demodulated data signal with the reduced phase noise using an output device, such as a display or a real-time oscilloscope.

Figure 2:
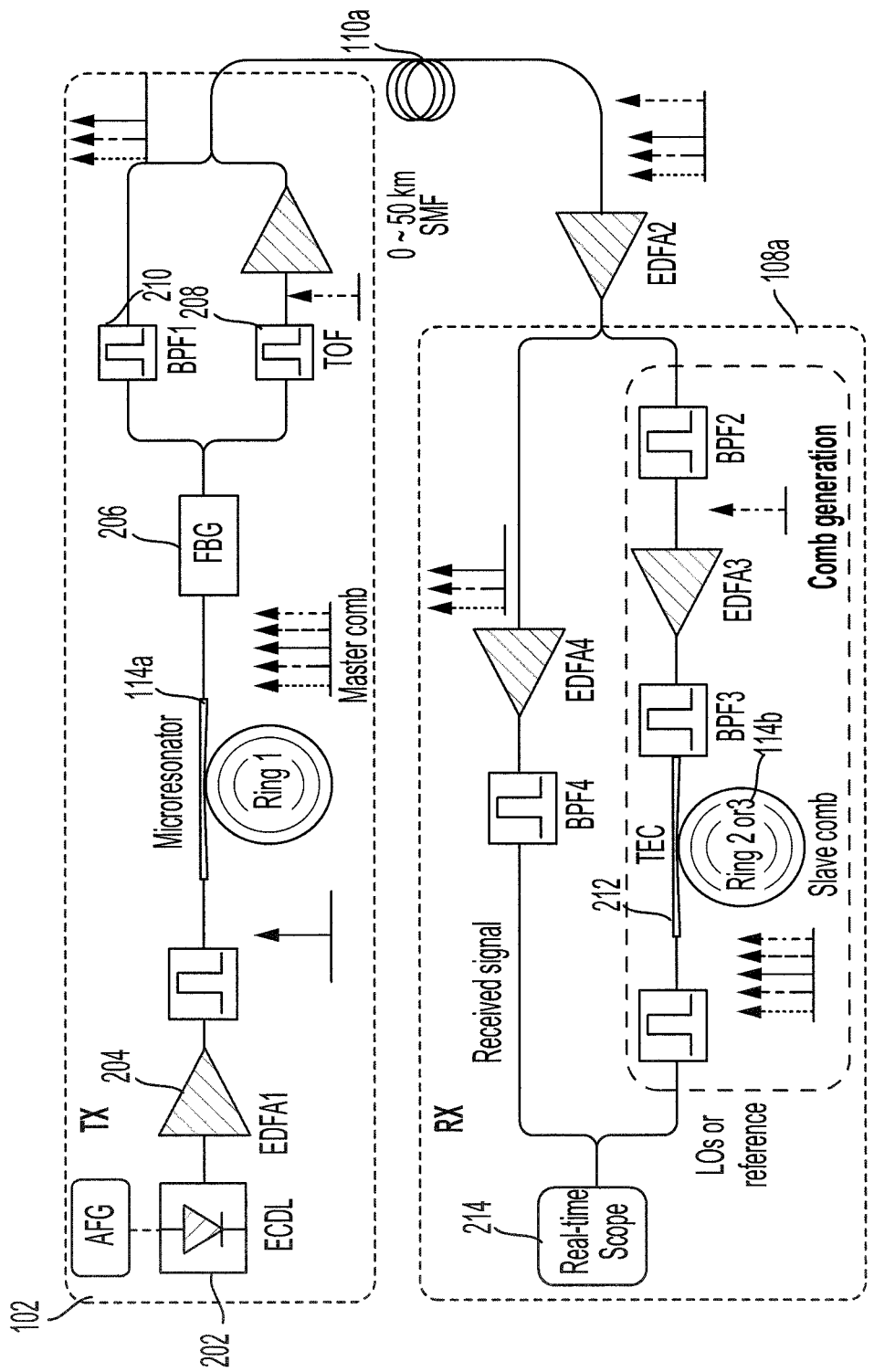
FIG. 2 shows the different components of the transmitter and the one or more receivers of the optical communication system of FIG. 1 in an experimental setup according to an aspect of the invention.

FIG. 2 shows the different components of the transmitter 102 and the one or more receivers 108a-b in an experimental setup. The experimental setup demonstrates the multiple Kerr comb generation using different master comb lines.

The communication system 100, within the transmitter 102, may have an external cavity diode laser (ECDL) 202 that is used as the pump. The external cavity diode laser 202 is coupled to and provides the pump to the high-power erbium-doped fiber amplifier (EDFA) 204, which amplifies the pump. The EDFA 204 is coupled to a microresonator, such as the master microresonator 114a, through a lensed fiber.

The master microresonator 114a generates the master comb in the soliton state. The arbitrary function generator controls the wavelength of the pump laser to around approximately 1553.4 nm. As the pump laser is coupled out of the master microresonator 114a, the pump laser may be suppressed. The transmitter 102 may have a tunable fiber Bragg grating (FBG) 206. The FBG may suppress the residual pump that enters from the master microresonator 114a.

Considering the high transmission loss, the master comb may be split into two paths, and the master comb line, which may be used as the slave comb, is selected using a tunable optical filter (TOF) 208 and amplified on a lower path. On an upper path, a 30-nm bandpass filter (BPF 1) 200 may be used to extract the comb lines of the slave comb pump.

The extracted comb lines and the slave comb pump are combined together and transmitted through a span of SMF 110a-b. The SMF 110a-b may be of varying lengths. On the receiver 108a-b, the slave comb pump is selected again and sent into the second microresonator, such as the slave microresonator 114b. As the wavelength of the slave comb pump is fixed, thermally controlled comb generation is required to generate the slave comb. Because of the limited tuning speed of the temperature controller (TEC) 212, the slave comb is generated in a low-phase-noise state instead of a soliton state. The regenerated comb lines serving as LOs or references are mixed with the corresponding master comb lines in a photodetector and their beat notes are characterized by a real-time oscilloscope 214.

Figure 3A:
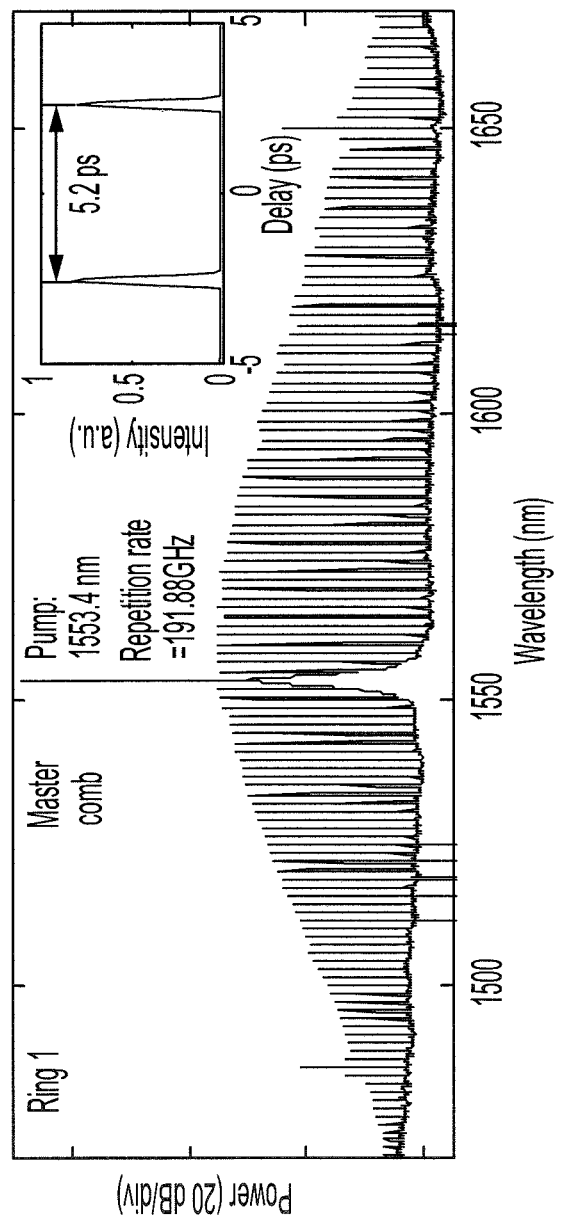
FIGS. 3A-3D shows the spectra of the master and generated slave comb waves produced by the optical communication system of FIG. 1 according to an aspect of the invention.
Figure 3B:
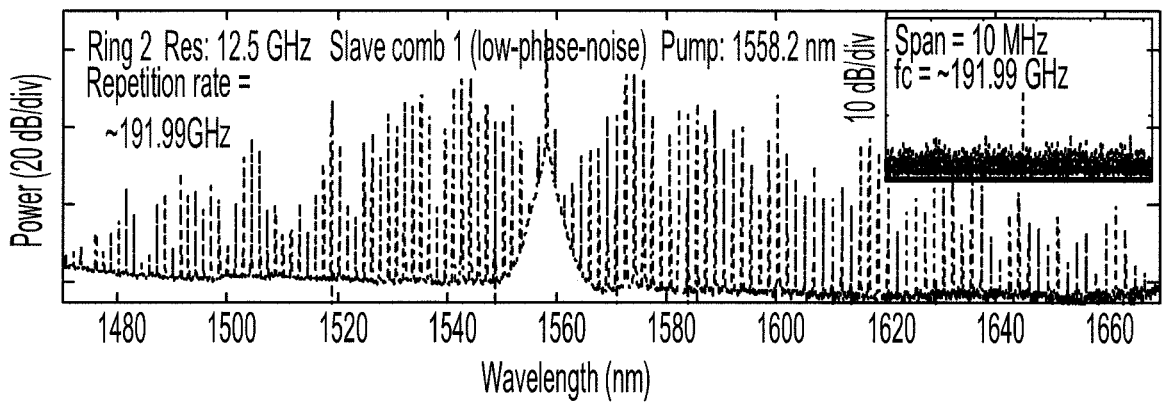
Figure 3C:
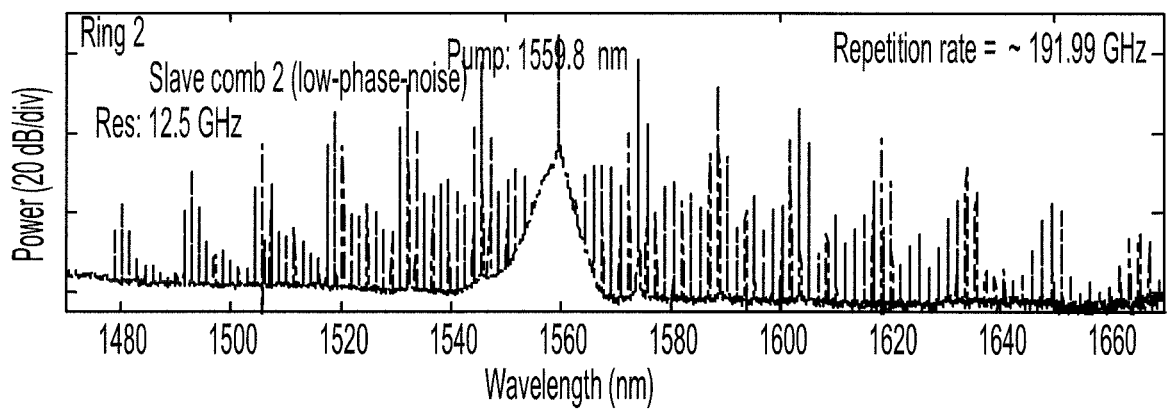
Figure 3D:
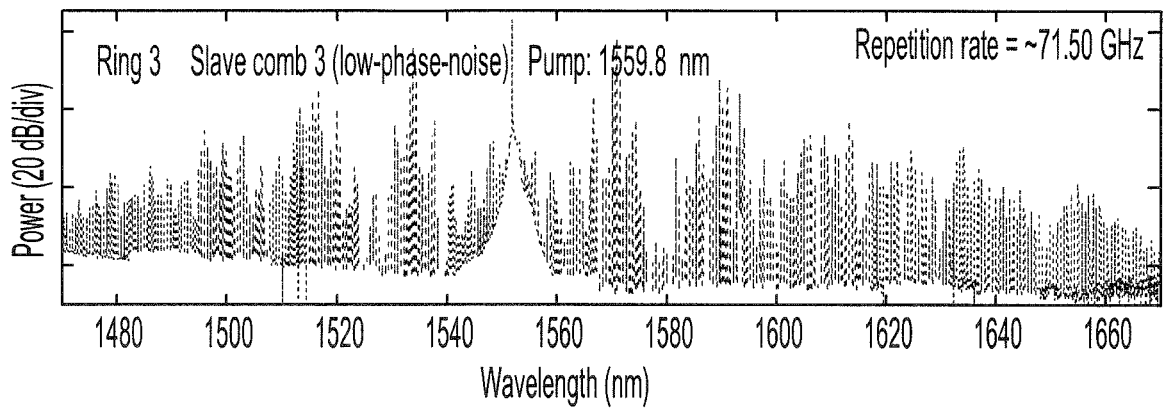

FIGS. 3A-3D show the spectra of the master and generated slave combs. The master comb in the soliton state, as shown in FIG. 3A, has a smooth spectral envelope while the slave combs in the low-phase-noise state exhibit a large power difference between different comb lines. The left and right insets of FIG. 3A are the optical microscope image of the integrated microresonator and the autocorrelation trace of the soliton pulse, respectively. FIGS. 3B and 3C are the spectra of low-phase-noise slave combs separately pumped by two master comb lines after 25 km and 50 km fiber transmission. The inset of FIG. 3B shows the corresponding RF beat note of neighboring comb lines measured by amplitude modulation down-mixing. The repetition rates of the master and slave combs are measured to be 191.88 and ~191.99 GHz. The repetition rate difference is caused by the slightly different ring resonator lengths. In addition, a slave comb with a repetition rate of ~72 GHz is generated using another slave microresonator, as shown in FIG. 3D, by the master comb line at 1551.8 nm. As shown in FIGS. 3B-3D, the low-phase-noise combs exhibit different spectrum shape at different pump wavelengths. With better thermally controlled comb generation, slave combs in the soliton state with predictable spectrum generated at different pump wavelengths may be obtained.

Figure 4A:
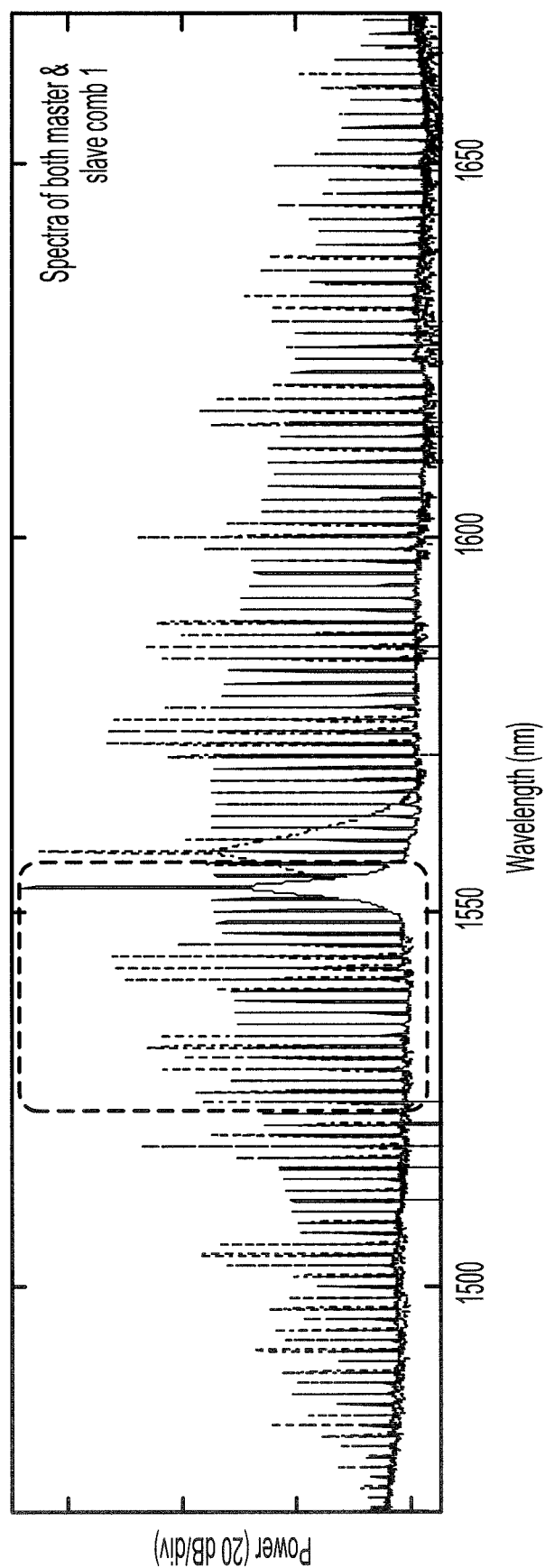
FIG. 4A shows the combined spectra of the master comb and the first slave comb of the optical communication system of FIG. 1 according to an aspect of the invention.

The relationship between the master comb and a first and a second slave combs are further investigated through the beat notes of their corresponding comb lines. FIG. 4A shows the combined spectra of the master comb and the first slave comb where the comb lines from 1530 nm to 1560 nm are extracted for characterization.

Figure 4C:
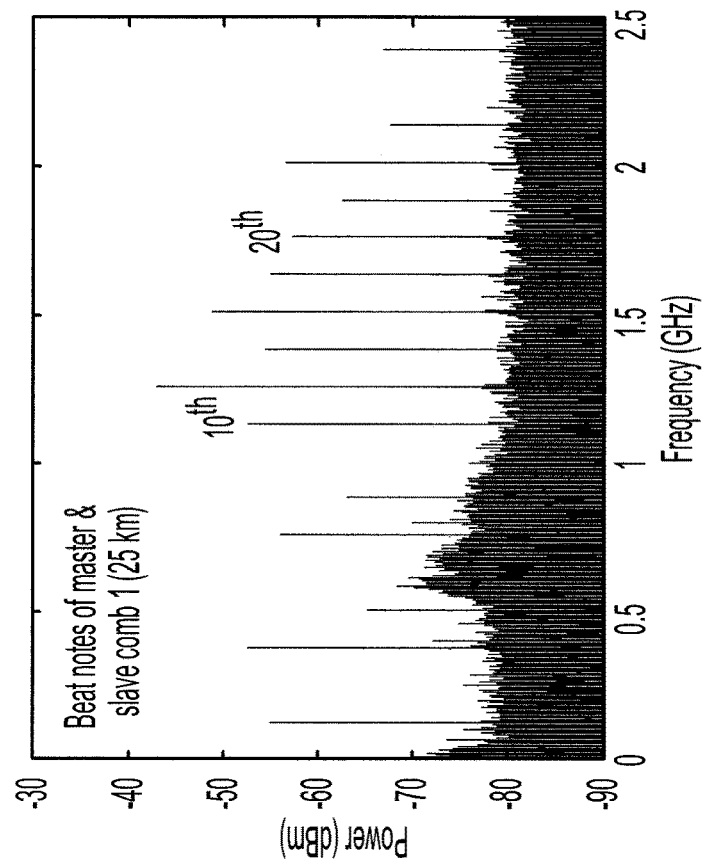
FIG. 4C shows the beat notes of selected comb lines from combs for 25 km transmission of the optical communication system of FIG. 1 according to an aspect of the invention.
Figure 4B:
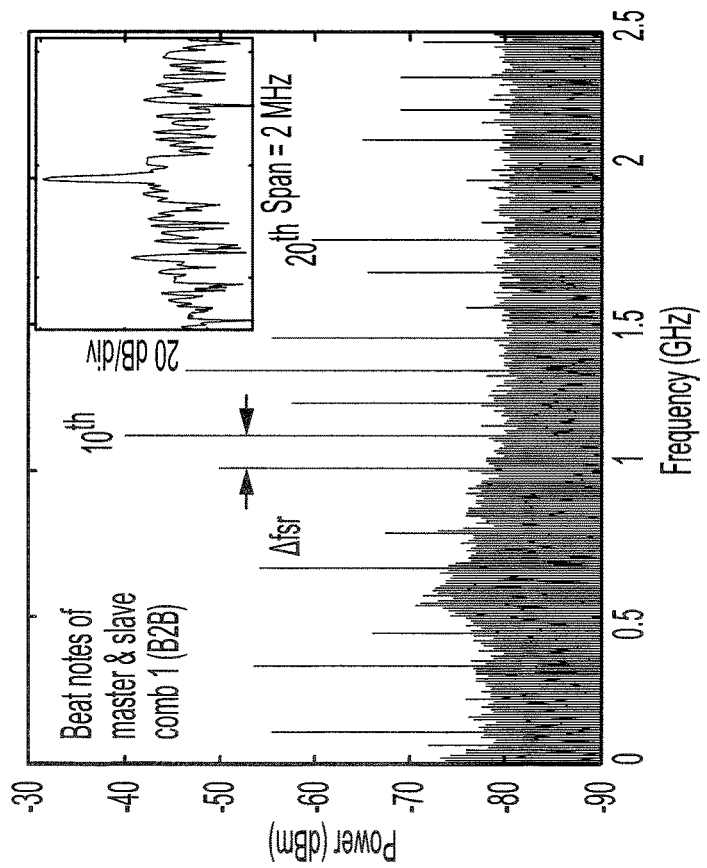
FIG. 4B shows the beat notes of selected comb lines from combs for B2B fiber transmission of the optical communication system of FIG. 1 according to an aspect of the invention.

The beat notes of selected comb lines from two combs for B2B and 25-km fiber transmission are shown in FIG. 4B and FIG. 4C. The difference between the RF spectra results from a slight spectrum change of the first slave comb with different transmissions. The inset of FIG. 4B is the zoom-in spectrum of the $10^{th}$ RF beat note.

Figure 5A:
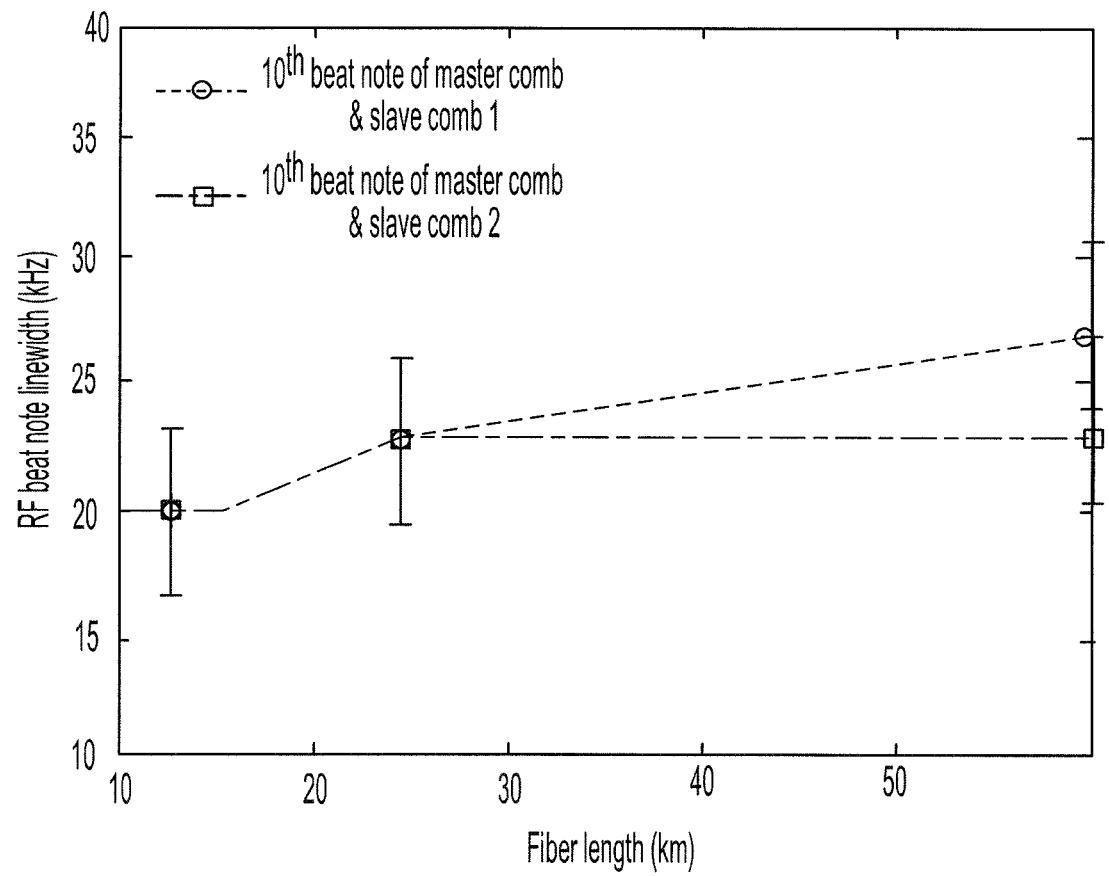
FIG. 5A shows the linewidth of the $10^{th}$ RF beat note at various fiber lengths using the optical communication system of FIG. 1 according to an aspect of the invention.
Figure 5B:
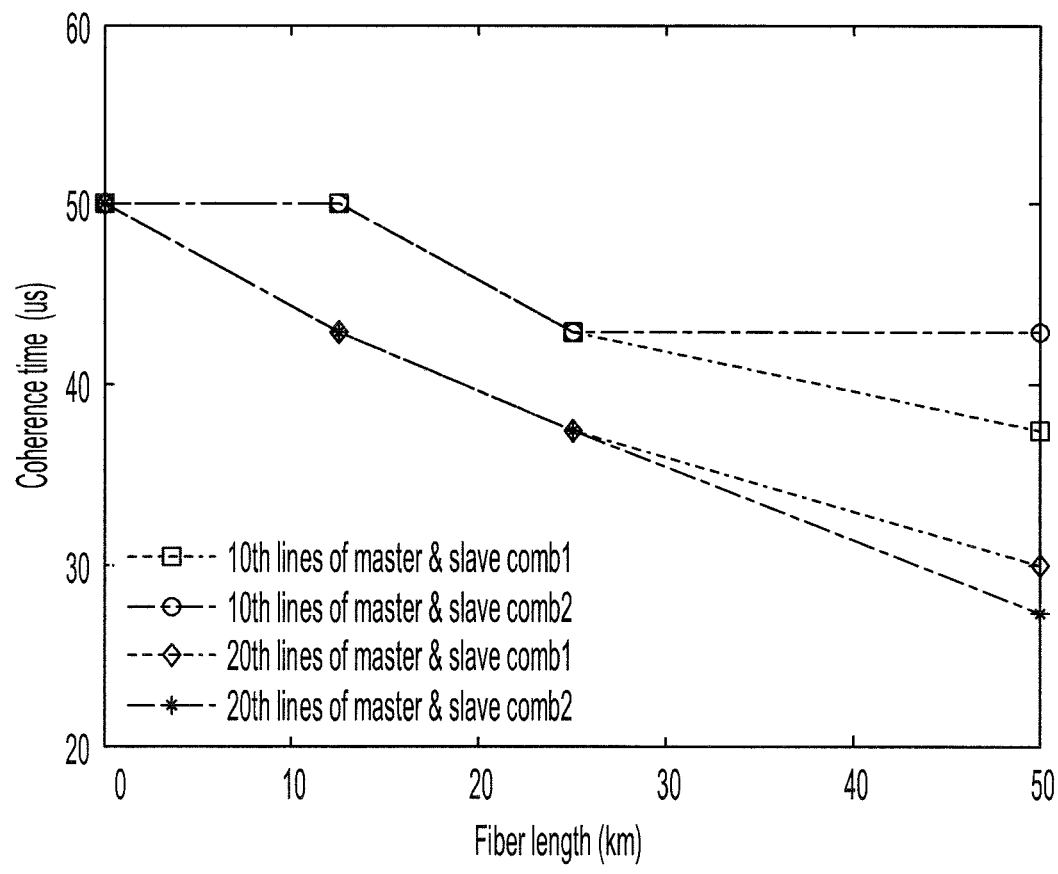
FIG. 5B shows the coherence time (the inverse of spectral linewidth) between the $10^{th}$ and $20^{th}$ master and slave comb lines using the optical communication system of FIG. 1 according to an aspect of the invention.
Figure 5C:
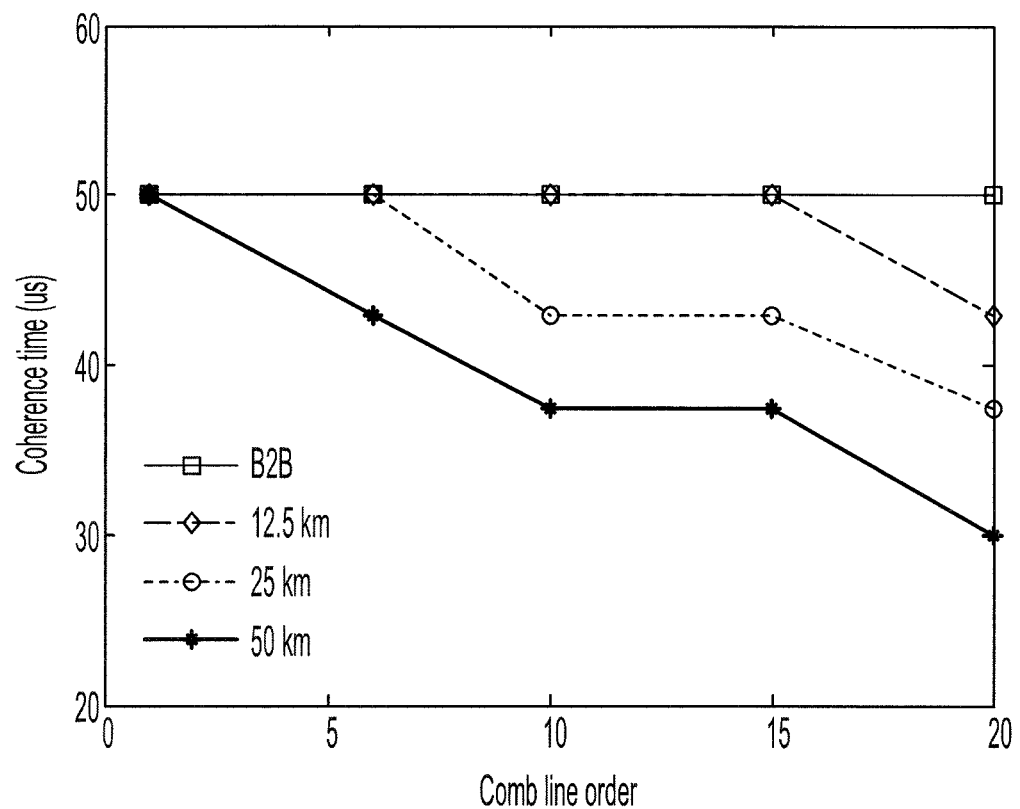
FIG. 5C shows the effect of the comb line order on the coherence time according to an aspect of the invention.

The linewidth of the $10^{th}$ RF beat note at various fiber lengths is shown in FIG. 5A for the master comb with or without being transmitted to the slave sites. The linewidths of beat notes between the transmitted master and the first and second slave comb lines almost stay unchanged after fiber transmission. FIG. 5B shows the coherence time (the inverse of spectral linewidth) between the $10^{th}$ and $20^{th}$ master and slave comb lines. When slave combs are generated by different master comb lines, the coherence time between the master comb and different slave combs is close to each other around 40 μs. However, for both the first slave comb and the second slave comb, the coherence time slightly decreases from the $10^{th}$ to $20^{th}$ comb lines. The effect of the comb line order on the coherence time is shown in FIG. 5C. When compared to back-to-back (B2B) transmission, the coherence time will be reduced to ~30 μs for comb lines far away from the slave comb pump after fiber transmission. This may be attributed to the temporal decorrelation of the slave comb pump and the corresponding comb lines. Such effect could be alleviated by adding dispersion compensation fiber.

Figure 6A:
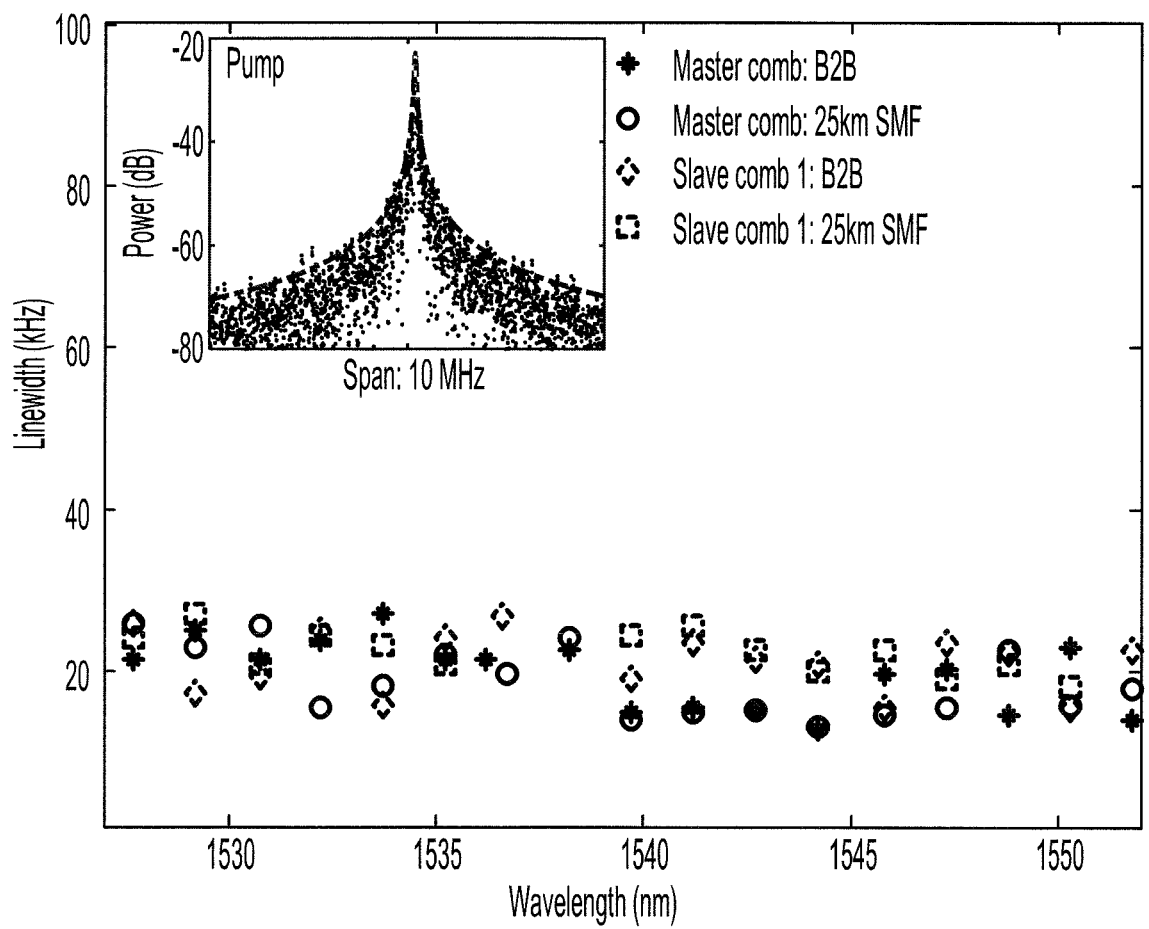
FIG. 6A shows that the inset is the measured power spectrum density of the pump laser according to an aspect of the invention.
Figure 6C:
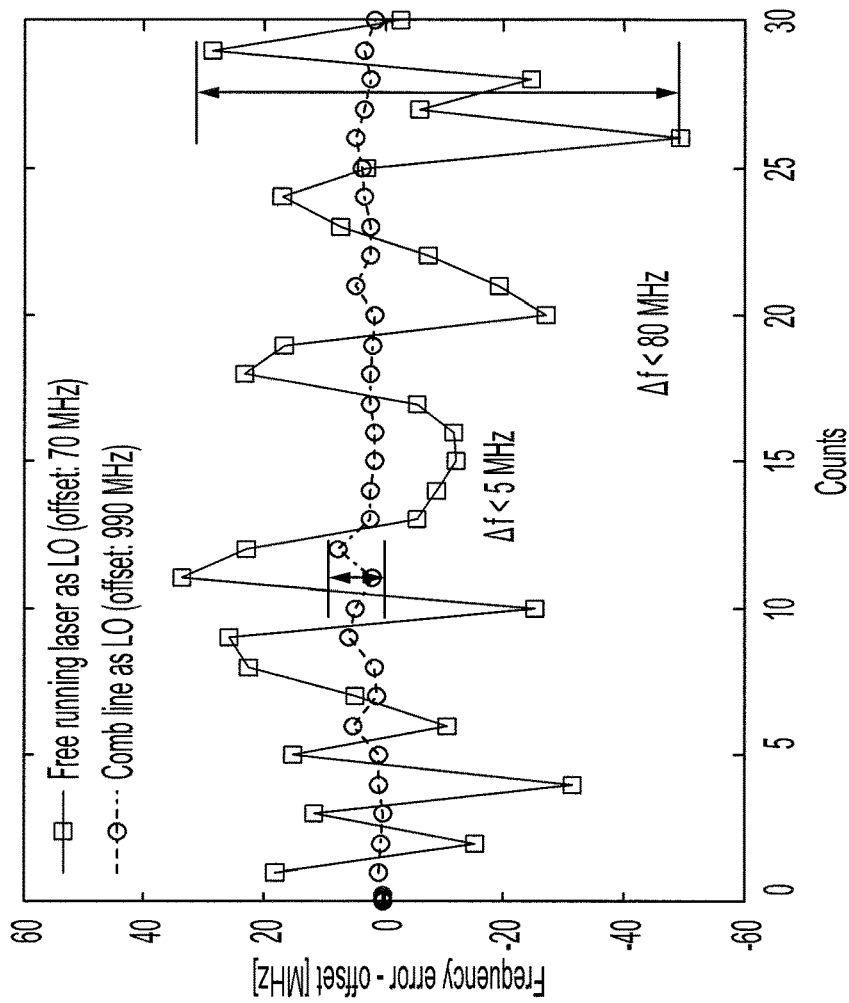
FIG. 6C shows the frequency errors measured on an oscilloscope according to an aspect of the invention.
Figure 6B:
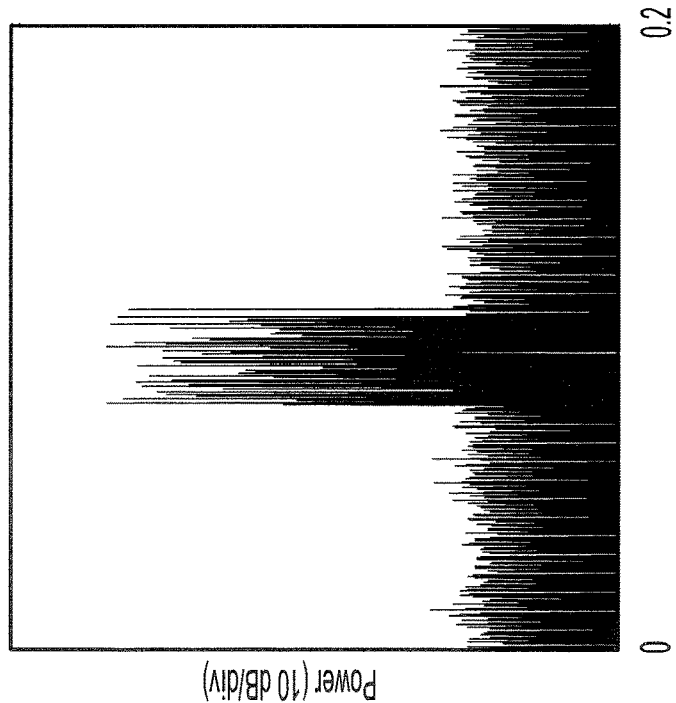
FIG. 6B shows the RF beat note between a selected master comb line and the free-running (FR) laser according to an aspect of the invention.

FIG. 6A shows that the inset is the measured power spectrum density of the pump laser (LW: ~20 kHz). The linewidths of the comb lines from both combs are about 15-30 kHz for B2B and 25 km transmissions, which shows that there is no obvious linewidth broadening for the master and slave combs. Moreover, the beat notes of the two combs are measured with the first slave comb generated by a free-running (FR) pump laser with a linewidth: <300 kHz) instead of the master comb line. FIG. 6B shows the RF beat note between a selected master comb line and the FR laser. The spectrum of the beat exhibits multiple peaks because the master comb line and the FR laser are not phase-locked. The frequency errors are further measured, as shown in FIG. 6C, by an oscilloscope when the regenerated comb line and the FR laser separately serve as the LO. In the former, the variation of the frequency error (Δf) is less than 5 MHz, which is about 16 times smaller than that of the latter one using the FR laser as the LO.

Figure 7:
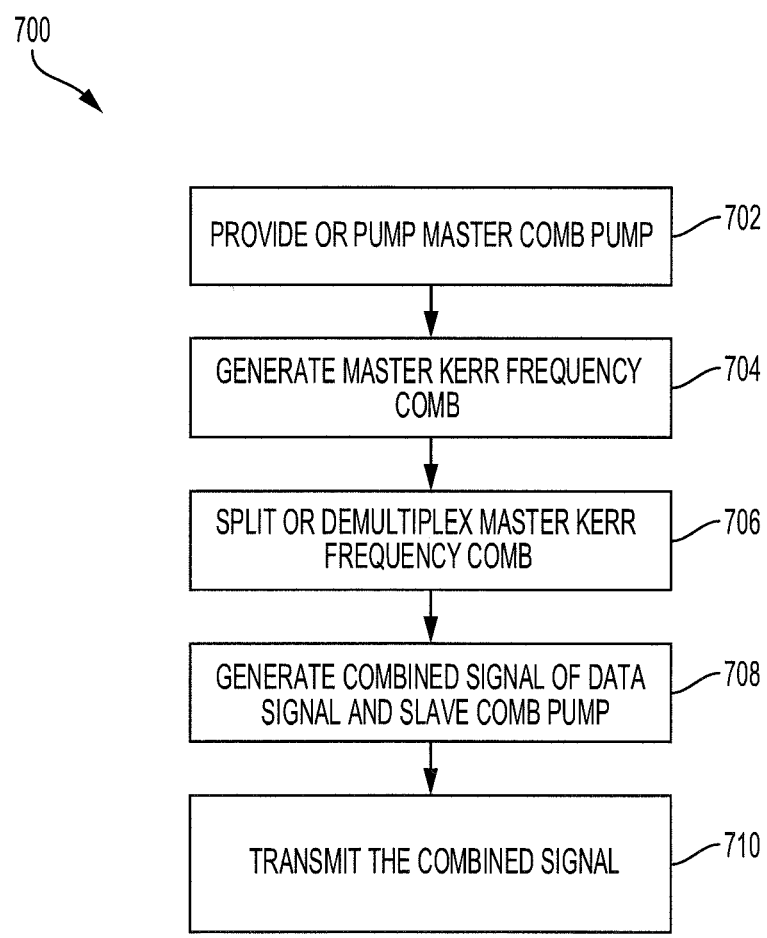
FIG. 7 shows an example flow diagram of transmitting the multiple signals to multiple receivers using the communication system 100 of FIG. 1 according to an aspect of the invention.

FIG. 7 describes an example process of transmitting the multiple signals to multiple receivers using the communication system 100 of FIG. 1. Within the transmitter 102 of the communication system 100, a light source 112 is coupled to and provides the master comb pump to a master microresonator 114a (702). The master microresonator 114a generates a master Kerr comb using the master comb pump (704). The arbitrary function generator may control a wavelength of the master comb pump to generate the master Kerr comb. The master microresonator 114a may use a parametric frequency conversion to convert the master comb pump into multiple optical pulses corresponding to the master Kerr comb. Once the master Kerr frequency comb is generated, the master microresonator 114a may provide the master Kerr comb to a demultiplexer 104a or splitter.

The demultiplexer 104a or splitter selects, splits, separates, extracts or demultiplexer the master Kerr comb into multiple comb lines (706). Each of the comb lines may be used as a slave comb pump or to carry a modulated data signal. The demultiplexer 104a places each of the one or more slave comb pumps and each of the modulated data signals on a different comb line. Each slave comb pump corresponds to one or multiple modulated data signal, which is to be transmitted or outputted to a different receiver. This allows a single master Kerr comb to form multiple signals to be sent to different receivers at different locations. The demultiplexer 104a or splitter places a slave comb pump on one comb line and the modulated data signal on another comb line and provides the two comb lines to one or more multiplexers 106a-b or other combiners.

The one or more multiplexers 106a-b or other combiners generate a combined signal from the modulated data signal on one comb line and the slave comb pump on another comb line (708). The multiplexers 106a-b mix, multiplex or otherwise combine the slave comb pumps 116a-b with the corresponding modulated data signal before fiber transmission. The multiplexers 106a-b form a combined signal of the slave comb pump and the corresponding modulated data signal. The multiplexer 106a-b may use an array waveguide grating or a tunable fiber Bragg grating to form the combined signal. Once the combined signal is formed, the multiplexers 106a-b transmit the combined signal to one of one or more receivers 108a-b (710). The multiplexer 106a-b may transmit the combined signal across different lengths of SMF 110a-b to send to different receivers 108a-b.

Figure 8:
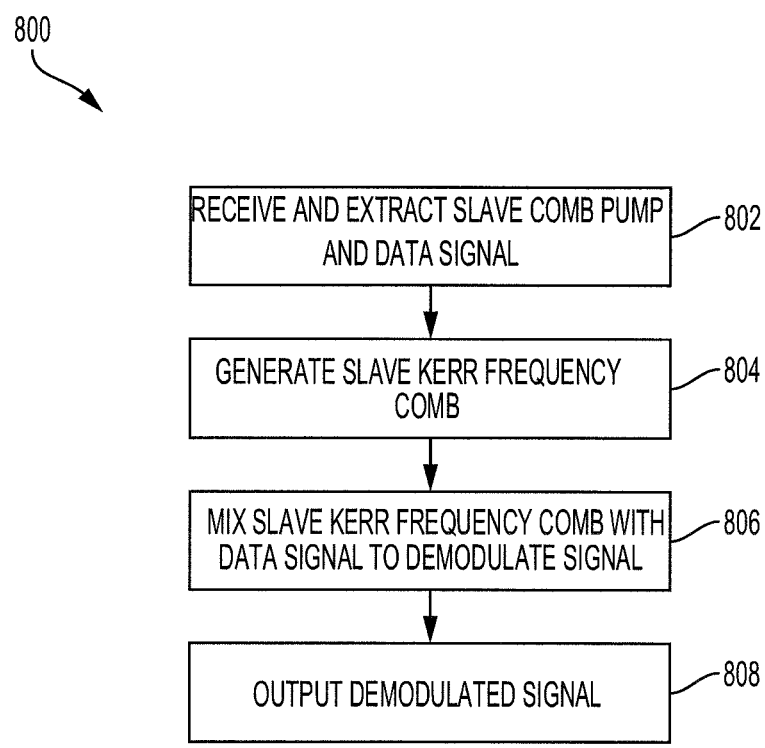
FIG. 8 shows an example flow diagram of receiving the multiple signals at multiple receivers using the communication system 100 of FIG. 1 according to an aspect of the invention.

FIG. 8 describes an example process of receiving the multiple signals at multiple receivers using the communication system 100 of FIG. 1. One or more demultiplexers 104b-c or other splitters select, split or otherwise receive the combined signal on the SMF 110a-b. The one or more demultiplexers 104b-c select, split or otherwise extract the slave comb pumps 116a-b and the modulated data signals 120a-b from the combined signals (802). The one or more demultiplexers 104b-c place the extracted slave comb pumps 116a-b and the modulated data signals 120a-b onto different comb lines and feed or provide the different comb lines into one or more receivers 108a-b.

The one or more receivers 108a-b are coupled to the one or more demultiplexers 104b-c and each have a microresonator, such as a slave microresonator 114b, and a demodulator 122. The slave microresonator 114b may receive the slave comb pump 116a-b on the comb line and generate a slave Kerr frequency comb (804). The slave microresonator 114 uses the comb line with the slave comb pump to generate a slave Kerr frequency comb, which is provided to one or more demodulators 122 and may be later demodulated the data signal on another comb line. The slave Kerr frequency comb may be mutually coherent with the master Kerr frequency comb because there is a well-defined phase relationship between the slave comb pump and the comb lines of the master Kerr comb.

The one or more demodulators 122 mix the slave Kerr frequency comb with the modulated data signal to demodulate or extract the data signal from the modulated data signal (806). As a result, the resulting demodulated data signal has less or a reduced amount of phase noise. The one or more demodulators 122, such as a photodetector, output the demodulated signal with the reduced phase noise (808). The output may be displayed on a display, such as a real-time oscilloscope or other display.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A communication system for generating multiple Kerr frequency combs, comprising:
   a continuous-wave (CW) pump laser configured to provide a master signal;
   a master microresonator configured to generate a master Kerr frequency comb using the master signal;
   a splitter configured to split the master Kerr frequency comb into a first comb line used to transmit a data signal and a second comb line used as a slave signal; and
   a combiner or multiplexer configured to combine the first comb line carrying signal and the second comb line to produce a combined signal.

2. The communication system of claim 1, wherein the master signal is a master comb pump and the slave signal is a slave comb pump.

3. The communication system of claim 2, further comprising:
   a first demultiplexer configured to receive the combined signal and extract the second comb line that is used as the slave comb pump; and
   a slave microresonator configured to generate a slave Kerr frequency comb from the second comb line.

4. The communication system of claim 3, further comprising:
   a demodulator connected to the slave microresonator and configured to:
     receive the generated slave Kerr frequency comb,
     mix the generated slave Kerr frequency comb with the data signal on the first comb line to demodulate the data signal, and
     output the demodulated data signal that has reduced phase noise.

5. The communication system of claim 2, wherein the splitter forms a third comb line used to transmit a second data signal and a fourth comb line used as a second slave comb pump.

6. The communication system of claim 5, further comprising:
   a second combiner that is configured to combine the third comb line and the fourth comb line to form a second combined signal;
   a second splitter that is configured to extract the fourth comb line that is used as the second slave comb pump; and a second slave microresonator configured to receive the fourth comb line and use the fourth comb line as the second slave comb pump to generate a second slave Kerr frequency comb.

7. A communication system for generating multiple Kerr frequency combs, comprising:
a first microresonator connected to a laser controlled by an arbitrary function generator to generate a master Kerr frequency comb;
a first demultiplexer coupled to the first microresonator and configured to split the master Kerr frequency comb onto a first comb line with a slave comb pump and a second comb line with a data signal; and
a combiner configured to transmit a combined slave comb pump and data signal.

8. The communication system of claim 7, further comprising:
a second demultiplexer configured to receive the combined slave comb pump and data signal and extract the slave comb pump onto a first comb line and the data signal onto a second comb line;
a second microresonator configured to generate a slave Kerr frequency comb from the slave comb pump; and
a photodetector connected to the second microresonator and configured to output a demodulated signal using the generated slave Kerr frequency comb and the data signal.

9. The communication system of claim 8, wherein the first demultiplexer is an array waveguide grating or a tunable fiber Bragg grating.

10. The communication system of claim 8, wherein slave Kerr frequency comb is mutually coherent with the master Kerr frequency comb.

11. The communication system of claim 7, wherein the first demultiplexer is further configured to split the master Kerr frequency comb onto a third comb line and a fourth comb line, wherein the third comb line has a second slave comb pump and the fourth comb line has a second data signal.

12. The communication system of claim 11, further comprising:
a second combiner configured to:
combine the second slave comb pump with the second data signal to form a second combined signal, and transmit the combined slave comb pump and the second data signal.

13. The communication system of claim 11, further comprising:
a third demultiplexer configured to receive the second combined signal and select or extract the second slave comb pump from the second combined signal; and
a third microresonator configured generate a second slave Kerr frequency comb from the second slave comb pump.

14. A method of generating multiple Kerr frequency combs, comprising:
generating, using a first microresonator, a master Kerr frequency comb using a master signal;
splitting or demultiplexing, using a splitter or demultiplexer, the master Kerr frequency comb into a first data signal, a first slave signal, a second data signal and a second slave signal;
combining, using a first combiner, the first data signal and the first slave signal into a first combined signal;
combining, using a second combiner, the second data signal and the second slave signal into a second combined signal; and
transmitting, using the first combiner and the second combiner, the first combined signal to a first receiver and the second combined signal to a second receiver.

15. The method of claim 14, comprising:
extracting the first data signal and the first slave signal from the first combined signal; and
extracting the second data signal and the second slave signal from the second combined signal.

16. The method of claim 15, further comprising:
generating a slave Kerr frequency comb from the first slave signal;
demodulating the first data signal using the slave Kerr frequency comb; and
outputting the demodulated signal.

17. The method of claim 16, wherein demodulating the first data signal using the slave Kerr frequency comb includes mixing the generated slave Kerr frequency comb with the first data signal.

18. The method of claim 17, wherein the outputted demodulated signal has reduced noise.

19. The method of claim 14, wherein the first combined signal is transmitted to the first receiver across a first single mode fiber and the second combined signal is transmitted to the second receiver across a second single mode fiber.

20. The method of claim 14, wherein generating the master Kerr frequency comb includes controlling a wavelength of the master comb pump using an arbitrary function generator.

* * * * *